(12) United States Patent
Grillanda (10) Patent No.: US 11,838,055 B2
(45) Date of Patent: Dec. 5, 2023

(54) APPARATUS COMPRISING SERIALLY CONNECTED ELECTRO-ABSORPTION MODULATORS

(71) Applicant: Nokia Solutions and Networks OY, Espoo (FI)

(72) Inventor: Stefano Grillanda, Springfield, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/155,459

(22) Filed: Jan. 22, 2021

(65) Prior Publication Data

US 2022/0239378 A1 Jul. 28, 2022

(51) Int. Cl.
- *H04B 10/50* (2013.01)
- *H04B 10/556* (2013.01)
- *H04B 10/524* (2013.01)
- *H04B 10/54* (2013.01)
- *H04B 10/516* (2013.01)

(52) U.S. Cl.
CPC ....... *H04B 10/5051* (2013.01); *H04B 10/524* (2013.01); *H04B 10/541* (2013.01); *H04B 10/5561* (2013.01); *H04B 10/50* (2013.01); *H04B 10/505* (2013.01); *H04B 10/516* (2013.01)

(58) Field of Classification Search
CPC ............ H04B 10/5051; H04B 10/5561; H04B 10/524; H04B 10/541; H04B 10/50; H04B 10/505; H04B 10/516
USPC .................................................. 398/182–201
See application file for complete search history.

(56) References Cited

U.S. PATENT DOCUMENTS

| | | | | |
|---|---|---|---|---|
| 5,394,260 A * | 2/1995 | Suzuki | ................. | G02F 1/0121 372/12 |
| 5,434,693 A * | 7/1995 | Tanaka | ................. | H04B 10/50 398/192 |
| 5,889,607 A * | 3/1999 | Suzuki | ................. | G02F 1/0121 398/186 |
| 6,014,392 A * | 1/2000 | Imai | ..................... | G02F 1/0121 372/38.02 |
| 6,359,720 B1 * | 3/2002 | Yamada | ............... | G02F 1/0121 359/245 |
| 6,381,056 B1 * | 4/2002 | Ellis | ................ | H04B 10/25077 398/183 |

(Continued)

*Primary Examiner* — Dibson J Sanchez
(74) *Attorney, Agent, or Firm* — Mendelsohn Dunleavy, P.C.; Steve Mendelsohn (57) ABSTRACT

An optical data transmitter having M serially optically connected electro-absorption modulators (EAMs) individually driven using ON-OFF-keying (OOK) electronics, where M is an integer greater than one. In an example embodiment, the optical data transmitter can be used to generate an intensity-modulated optical signal carrying symbols of a $2^M$-level unipolar pulse-amplitude-modulation constellation. The OOK electronics enables the DC bias voltages and/or AC amplitudes of the two-level drive signals applied to different EAMs to be individually controllable to achieve desired uniform or non-uniform separation between the constellation levels. In at least some embodiments, temperatures of different EAMs may also be individually controllable. In various embodiments, the EAMs may operate in reflection or in transmission.

18 Claims, 5 Drawing Sheets

(56) References Cited

U.S. PATENT DOCUMENTS

| | | | |
|---|---|---|---|
| 6,678,479 B1* | 1/2004 | Naoe | H04B 10/5051 398/183 |
| 7,039,258 B2* | 5/2006 | Gunn, III | G02F 1/025 385/14 |
| 9,806,821 B2* | 10/2017 | Nakamura | H04B 10/541 |
| 9,900,021 B1* | 2/2018 | Elliott | G02F 1/011 |
| 9,933,639 B1* | 4/2018 | Lin | G02F 1/025 |
| 10,036,904 B1* | 7/2018 | Nagarajan | G02F 1/2257 |
| 10,291,327 B1* | 5/2019 | Kwon | H04B 10/54 |
| 10,409,093 B2* | 9/2019 | Nejadmalayeri | G02F 1/0121 |
| 10,411,807 B1* | 9/2019 | Earnshaw | G02F 1/21 |
| 10,727,948 B2 | 7/2020 | Hu et al. | |
| 2002/0159665 A1* | 10/2002 | Burie | G02F 1/225 385/1 |
| 2005/0275920 A1* | 12/2005 | Sumi | B82Y 20/00 359/241 |
| 2007/0212079 A1* | 9/2007 | Ooi | H04B 10/5053 398/198 |
| 2007/0237444 A1* | 10/2007 | Keil | B82Y 20/00 385/40 |
| 2011/0091221 A1* | 4/2011 | De Gabory | H04B 10/5561 398/188 |
| 2013/0004175 A1* | 1/2013 | Silveira | G02F 1/015 359/344 |
| 2014/0105605 A1* | 4/2014 | Temporiti Milani | H04B 10/5051 398/115 |
| 2015/0063822 A1* | 3/2015 | Noguchi | H04B 10/541 398/140 |
| 2016/0103340 A1* | 4/2016 | Ding | G02F 1/025 385/2 |
| 2016/0164613 A1* | 6/2016 | Menezo | H04B 10/5161 398/115 |
| 2016/0370609 A1* | 12/2016 | Nakamura | G02F 1/0121 |
| 2017/0195058 A1* | 7/2017 | Wang | H04B 10/503 |
| 2017/0257170 A1* | 9/2017 | Nakahara | G02B 6/125 |
| 2018/0129082 A1* | 5/2018 | Lin | H04B 10/516 |
| 2018/0191536 A1* | 7/2018 | Chen | H04B 10/5161 |
| 2019/0028204 A1* | 1/2019 | Nakamura | H04B 10/69 |
| 2019/0052046 A1* | 2/2019 | Wang | G02F 1/01 |
| 2019/0068288 A1* | 2/2019 | Saad | H01S 5/0265 |
| 2020/0059065 A1* | 2/2020 | Imai | H01S 5/2228 |

* cited by examiner

*FIG. 4A*
- EAM $130_1$: DC REVERSE BIAS = 1 V; AC SWING = 0.6 V; T = 20°C
- EAM $130_2$: DC REVERSE BIAS = 1 V; AC SWING = 1.2 V; T = 20°C

| BIT WORD OF 148 | SIGNAL $132_1$ [V] | SIGNAL $132_2$ [V] | NORMALIZED OPTICAL OUTPUT |
|---|---|---|---|
| 11 | 0.7 | 0.4 | 0.59 |
| 10 | 0.7 | 1.6 | 0.53 |
| 01 | 1.3 | 0.4 | 0.46 |
| 00 | 1.3 | 1.6 | 0.4 |

*FIG. 4B*
- EAM $130_1$: DC REVERSE BIAS = 0.875 V; AC SWING = 0.75 V; T = 20°C
- EAM $130_2$: DC REVERSE BIAS = 1.375 V; AC SWING = 0.75 V; T = 20°C

| BIT WORD OF 148 | SIGNAL $132_1$ [V] | SIGNAL $132_2$ [V] | NORMALIZED OPTICAL OUTPUT |
|---|---|---|---|
| 11 | 0.5 | 1 | 0.75 |
| 10 | 0.5 | 1.75 | 0.71 |
| 01 | 1.25 | 1 | 0.67 |
| 00 | 1.25 | 1.75 | 0.63 |

*FIG. 4C*
- EAM $130_1$: DC REVERSE BIAS = 0.85 V; AC SWING = 0.7 V; T = 20°C
- EAM $130_2$: DC REVERSE BIAS = 1.4 V; AC SWING = 0.8 V; T = 20°C

| BIT WORD OF 148 | SIGNAL $132_1$ [V] | SIGNAL $132_2$ [V] | NORMALIZED OPTICAL OUTPUT |
|---|---|---|---|
| 11 | 0.5 | 1 | 0.71 |
| 10 | 0.5 | 1.8 | 0.67 |
| 01 | 1.2 | 1 | 0.62 |
| 00 | 1.2 | 1.8 | 0.58 |

*FIG. 4D*
- EAM $130_1$: DC REVERSE BIAS = 1.1 V; AC SWING = 1 V; T = 20°C
- EAM $130_2$: DC REVERSE BIAS = 1.1 V; AC SWING = 1 V; T = 45°C

| BIT WORD OF 148 | SIGNAL $132_1$ [V] | SIGNAL $132_2$ [V] | NORMALIZED OPTICAL OUTPUT |
|---|---|---|---|
| 11 | 0.6 | 0.6 | 0.67 |
| 10 | 0.6 | 1.6 | 0.6 |
| 01 | 1.6 | 0.6 | 0.53 |
| 00 | 1.6 | 1.6 | 0.47 |

*FIG. 5*

*FIG. 6* ns serially optically connected elec- 35
APPARATUS COMPRISING SERIALLY CONNECTED ELECTRO-ABSORPTION MODULATORS

BACKGROUND

Field

Various example embodiments relate to optical communication equipment and, more specifically but not exclusively, to optical modulators.

Description of the Related Art

This section introduces aspects that may help facilitate a better understanding of the disclosure. Accordingly, the statements of this section are to be read in this light and are not to be understood as admissions about what is in the prior art or what is not in the prior art.

An optical modulator is a device that can be used to manipulate a property of light, e.g., of an optical beam. Depending on which property of the optical beam is controlled, the optical modulator can be referred to as an intensity modulator, an amplitude modulator, a phase modulator, a polarization modulator, a spatial-mode modulator, etc. The telecom industry and its partners and suppliers develop, make, sell, and use a large variety of optical modulators, e.g., suitable for optical data transmitters.

SUMMARY OF SOME SPECIFIC EMBODIMENTS

Disclosed herein are various embodiments of an optical data transmitter having M serially optically connected electro-absorption modulators (EAMs) individually driven using ON-OFF-keying (OOK) electronics, where M is an integer greater than one. In an example embodiment, the optical data transmitter can be used to generate an intensity-modulated optical signal carrying symbols of a $2^M$-level unipolar pulse-amplitude-modulation (PAM) constellation. The OOK electronics enables the DC bias voltages and/or AC amplitudes of the two-level drive signals applied to different EAMs to be individually controllable to achieve desired uniform or non-uniform separation between the constellation levels. In at least some embodiments, temperatures of different EAMs may also be individually controllable. In different embodiments, the EAMs may operate in reflection or in transmission.

According to an example embodiment, provided is an apparatus, comprising: first and second electro-absorption modulators serially optically connected to generate a modulated optical signal; and an electrical drive circuit connected to electrically drive the first electro-absorption modulator using a first two-level drive signal and to electrically drive the second electro-absorption modulator using a second two-level drive signal, the first and second two-level drive signals being generated to cause the modulated optical signal to carry a sequence of data symbols, each of the data symbols encoding at least two bits.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Certain embodiments may benefit from the use of some features, apparatus, and/or methods disclosed in U.S. Pat. Nos. 10,411,807 and 10,727,948, both of which are incorporated herein by reference in their entirety.

An example electro-absorption modulator (EAM) is a semiconductor device capable of modulating the intensity of a light beam in response to a varying voltage applied thereto. The EAM's principle of operation is based on a change in the absorption spectrum caused by an electric field, which changes the semiconductor's bandgap energy but usually does not involve an excitation of the carriers by the electric field. Some EAMs may rely on the Franz-Keldysh effect. Some other EAMs may rely on the quantum-confined Stark effect (QCSE). An EAM may be designed to operate in transmission or in reflection.

Some EAMs may be referred to as being "surface-coupled." Such an EAM is surface-coupled in the sense that, in operation, this device receives an input light beam and emits a modulated light beam in a direction that is substantially orthogonal to a main plane of the device. Such a main plane typically corresponds to a major surface of the planar substrate on which the layered structures of the surface-coupled EAM (SCEAM) are formed during fabrication. Due to this geometry, a large number of SCEAMs can be manufactured on a single substrate (such as a semiconductor wafer), e.g., as described in the above-cited U.S. Pat. Nos. 10,411,807 and 10,727,948. A major surface of the substrate is typically characterized by two relatively large dimensions, e.g., width and length, and should be contrasted with an edge of the substrate, which may have one relatively large dimension (e.g., length) and one relatively small dimension (e.g., height). Such height may represent the thickness of the substrate.

In an example embodiment, a SCEAM may comprise a semiconductor-junction diode (e.g., a p-n or p-i-n diode) that can be appropriately electrically biased. Some of such semiconductor-junction diodes may include multiple-quantum-well (MQW) structures. In operation, the semiconductor diode may receive a combination of an appropriate reverse-bias voltage and a driving electrical radio-frequency (RF) signal, e.g., as described below in reference to FIGS. 2A-2C.

As used herein, the term "reverse bias" refers to an electrical configuration of a semiconductor-junction diode in which the n-type material is at a high electrical potential, and the p-type material is at a low electrical potential. The reverse bias typically causes the depletion layer to grow wider due to a lack of electrons and/or holes, which presents a high impedance path across the junction and substantially prevents a current flow therethrough. However, a very small reverse leakage current can still flow through the junction in the reverse-bias configuration.

Similarly, the term "forward bias" refers to an electrical configuration of a semiconductor-junction diode in which the n-type material is at a low potential, and the p-type material is at a high potential. If the forward bias is greater than the intrinsic voltage drop $V_{pn}$ across the corresponding p-n or p-i-n junction, then the corresponding potential barrier can be overcome by the charge carriers, and a relatively large forward current can flow through the junction. For example, for silicon-based diodes the value of $V_{pn}$ is approximately 0.7 V. For germanium-based diodes, the value of $V_{pn}$ is approximately 0.3 V, etc.

Figure 2A:
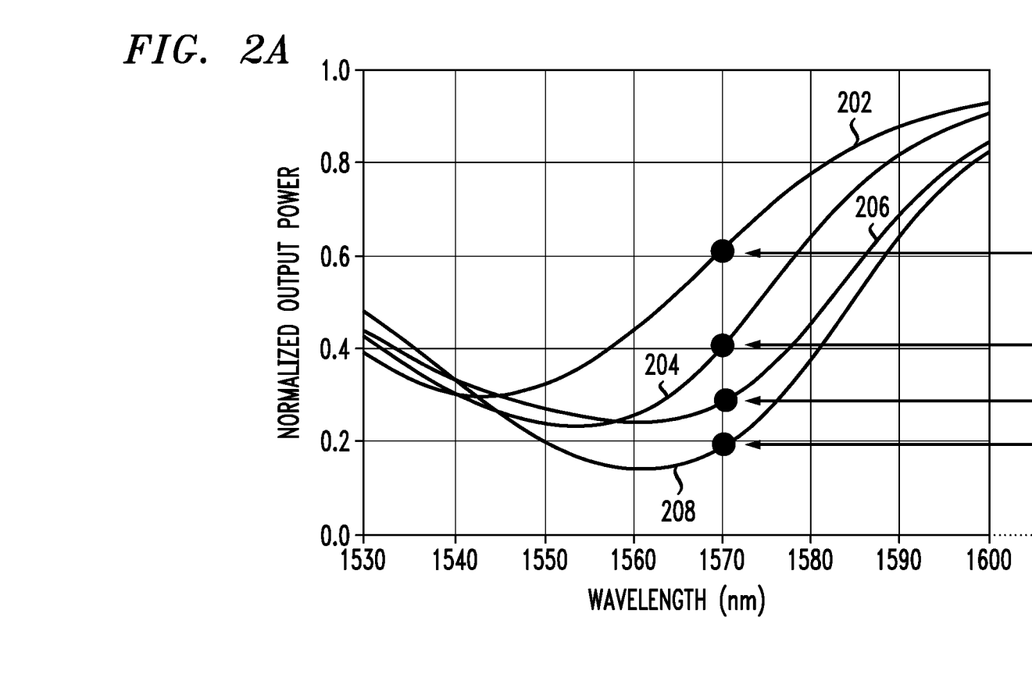
FIGS. 2A-2C illustrate certain characteristics of the optical data transmitter of FIG. 1 according to an embodiment.

At a fixed reverse-bias voltage and fixed temperature, the optical transfer function of a SCEAM is typically wavelength-dependent (see, e.g., FIG. 2A). A temperature change typically causes the optical transfer function of the SCEAM to shift in wavelength.

The driving electrical RF signal is typically an alternating-current (AC) signal superimposed on a direct-current (DC) reverse bias offset, such that the effective bias remains reverse at any point in the driving cycle. During the positive swing of the driving electrical RF signal, the electric-field strength increases relative to that at the DC bias point, thereby red-shifting the band edge. During the negative swing of the driving RF signal, the electric-field strength decreases relative to that at the DC bias point, thereby blue-shifting the band edge. These band-edge shifts change the light transmittance and/or reflectance in the SCEAM, thereby modulating the intensity of the corresponding output light beam.

Figure 1:
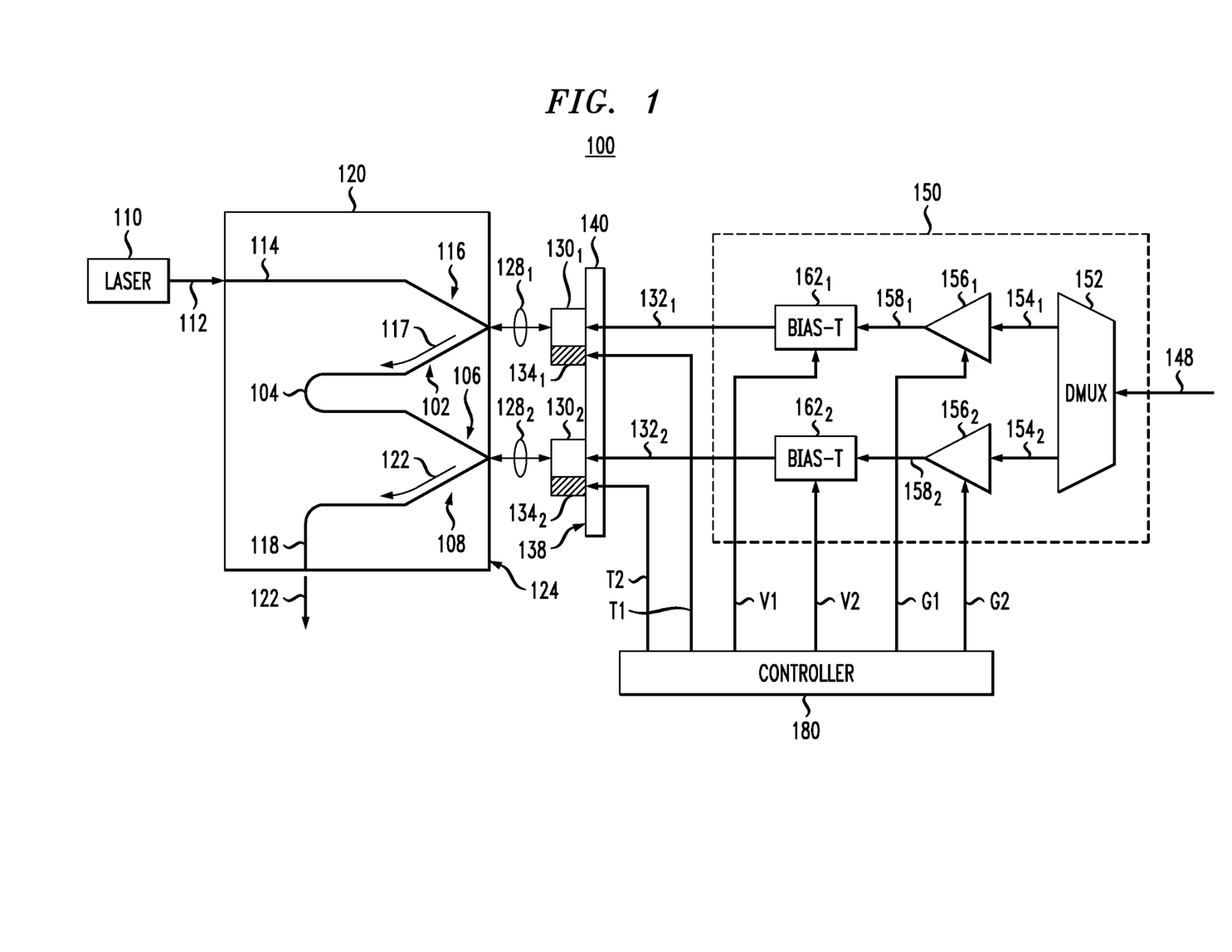
FIG. 1 shows a block diagram of an optical data transmitter according to an embodiment.

FIG. 1 shows a block diagram of an optical data transmitter 100 according to an embodiment. In operation, optical data transmitter 100 generates a modulated optical signal 122 in response to an electrical bitstream 148. In an example embodiment, bitstream 148 may be implemented using a non-return-to-zero (NRZ) electrical binary waveform. Modulated optical signal 122 may have a unipolar 4-PAM format, where PAM stands for pulse-amplitude modulation. A person of ordinary skill in the art will understand that unipolar PAM is a form of intensity modulation.

As shown in FIG. 1, optical data transmitter 100 comprises a laser 110, SCEAMs 130$_1$ and 130$_2$, and a planar lightwave circuit (PLC) 120. SCEAMs 130$_1$ and 130$_2$ are mounted on a major surface 138 of a device carrier 140. In an example embodiment, surface 138 is approximately orthogonal to PLC 120 such that SCEAMs 130$_1$ and 130$_2$ can be optically coupled to on-chip waveguides through the ends thereof located at an edge 124 of the PLC.

In an example embodiment, PLC 120 comprises optical waveguides 104, 114, and 118. A portion 116 of waveguide 114 and a portion 102 of waveguide 104 are oriented with respect to the edge 124 at an angle that is slightly (e.g., within ±15 degrees) different from 90 degrees. The ends of waveguide portions 116 and 102 located at the edge 124 are separated from one another by a relatively small distance selected such that both of the waveguide ends are in the field of view of a coupling lens 128$_1$ located between the edge 124 and SCEAM 130$_1$. A portion 106 of waveguide 104 and a portion 108 of waveguide 118 are similarly oriented with respect to the edge 124 at an angle that is slightly different from 90 degrees. The ends of waveguide portions 106 and 108 located at the edge 124 are separated from one another by a relatively small distance selected such that both of the waveguide ends are in the field of view of a coupling lens 128$_2$ located between the edge 124 and SCEAM 130$_2$. This geometric arrangement of PLC 120 and coupling lenses 128$_1$ and 128$_2$ serially optically connects laser 110 and SCEAMs 130$_1$ and 130$_2$. Lenses 128$_1$ and 128$_2$ are used to appropriately shape and redirect light and to provide relatively high optical-coupling efficiency between PLC 120 and SCEAMs 130$_1$ and 130$_2$.

In some embodiments, lenses 128$_1$ and 128$_2$ may be absent. In such embodiments, SCEAMs 130$_1$ and 130$_2$ are directly optically coupled (e.g., butt-coupled) to the edge 124 of PLC 120.

In operation, laser 110 may apply a continuous-wave (CW) light beam 112 to optical waveguide 114, e.g., as indicated in FIG. 1. Waveguide 114 directs light beam 112, through portion 116 and lens 128$_1$, toward SCEAM 130$_1$. Portion 102 of waveguide 104 then receives, through lens 128$_1$, a modulated light beam 117 emitted by SCEAM 130$_1$ in response to light beam 112. Waveguide 104 directs light beam 117, from portion 102 thereof, through portion 106 and lens 128$_2$, toward SCEAM 130$_2$. Portion 108 of waveguide 118 then receives, through lens 128$_2$, a modulated light beam 122, which is emitted by SCEAM 130$_2$ in response to modulated light beam 117. Waveguide 118 then directs modulated light beam 122 to an external circuit or optical fiber as indicated in FIG. 1.

Optical data transmitter 100 further comprises an electrical drive circuit 150 and an electronic controller 180. Electrical drive circuit 150 operates to generate electrical drive signals 132$_1$ and 132$_2$ in response to bitstream 148. Electrical drive signals 132$_1$ and 132$_2$ are then applied to SCEAMs 130$_1$ and 130$_2$, respectively. Controller 180 operates to control the configuration of electrical drive circuit 150, e.g., as described in more detail below. In some embodiments, controller 180 may further operate to control the temperatures of SCEAMs 130$_1$ and 130$_2$ by individually configuring the corresponding temperature-control units 134$_1$ and 134$_2$ thereof. In an example embodiment, a temperature control unit 134$_i$ (where i=1, 2) may include a corresponding electrical heater and/or a corresponding thermoelectric cooler thermally coupled to SCEAM 130$_i$ as known in the pertinent art. In some embodiments, temperature-control units 134$_1$ and 134$_2$ may be absent.

Electrical drive circuit 150 comprises a demultiplexer (DMUX) 152, electrical RF amplifiers 156$_1$ and 156$_2$, and bias tees 162$_1$ and 162$_2$. DMUX 152 operates to demultiplex bitstream 148 into bitstreams 154$_1$ and 154$_2$. Amplifiers 156$_1$ and 156$_2$ then amplify the NRZ waveforms of bitstreams 154$_1$ and 154$_2$, thereby generating electrical RF signals 158$_1$ and 158$_2$, respectively. Bias tees 162$_1$ and 162$_2$ operate to add respective DC bias voltages to electrical RF signals 158$_1$ and 158$_2$, thereby generating electrical drive signals 132$_1$ and 132$_2$, respectively.

In some embodiments, DMUX 152 may be absent. In such embodiments, bitstreams 154$_1$ and 154$_2$ may be received from external circuits. Typically, bitstreams 154$_1$ and 154$_2$ are uncorrelated.

In an example embodiment, each of electrical drive signals 132$_1$ and 132$_2$ is a two-level signal that alternates between a respective low level and a respective high level in response to the corresponding one of bitstreams 154$_1$ and 154$_2$. Several examples of low and high levels of electrical drive signals 132$_1$ and 132$_2$ are given in the tables of FIGS. 2C and 4A-4D.

Controller 180 is configured to: (i) control the electrical gains of amplifiers 156$_1$ and 156$_2$ using control signals G1 and G2, respectively; (ii) apply DC bias voltages V1 and V2 to the low-frequency ports of bias tees 162$_1$ and 162$_2$, respectively; and (iii) optionally, control the temperatures of SCEAMs 130$_1$ and 130$_2$ using control signals T1 and T2 applied to temperature-control units $134_1$ and $134_2$, respectively. In an example embodiment, controller 180 is capable of individually controlling the signals G1, G2, V1, V2, T1, and T2. Using this capability and depending on the desired configuration of transmitter 100, controller 180 may be used to implement some or all of the following features: (i) cause the gains of amplifiers $156_1$ and $156_2$ to be the same or different; (ii) cause DC bias voltages V1 and V2 to be the same or different; and (iii) cause the temperatures of SCEAMs $130_1$ and $130_2$ to be the same or different.

Figure 2B:
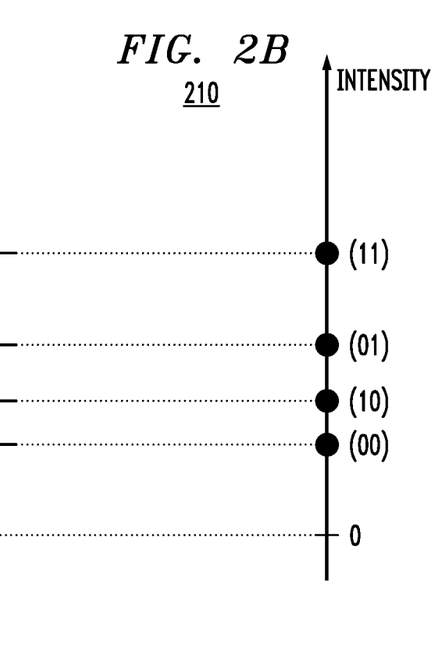
Figure 2C:
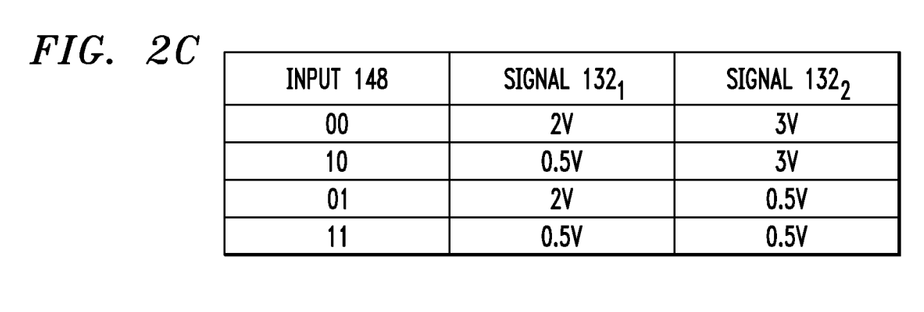

FIGS. 2A-2C illustrate certain characteristics of optical data transmitter 100 according to an embodiment. More specifically, FIG. 2A graphically shows optical transfer functions of optical data transmitter 100 at several different combinations of voltages of electrical drive signals $132_1$ and $132_2$. FIG. 2B graphically shows an example 4-level unipolar PAM constellation 210 that can be produced using the transfer functions of FIG. 2A. FIG. 2C shows a table that illustrates the configuration of electrical drive circuit 150 corresponding to FIGS. 2A-2B. In this particular embodiment, controller 180 operates to maintain the same fixed temperature (=20° C.) of SCEAMs $130_1$ and $130_2$. All voltages shown in the table of FIG. 2C are reverse voltages.

Referring to FIGS. 2A and 2C, the optical transfer functions 202, 204, 206, and 208 shown in FIG. 2A correspond to the levels of electrical drive circuit 150 indicated in the fifth, fourth, third, and second rows, respectively, of the table of FIG. 2C. More specifically, in response to a binary "zero" of bitstream $154_1$, electrical drive circuit 150 causes electrical drive signal $132_1$ to be at 2 V, which is the high level of that signal. In response to a binary "one" of bitstream $154_1$, electrical drive circuit 150 causes electrical drive signal $132_1$ to be at 0.5 V, which is the low level of that signal. In response to a binary "zero" of bitstream $154_2$, electrical drive circuit 150 causes electrical drive signal $132_2$ to be at 3 V, which is the high level of that signal. In response to a binary "one" of bitstream $154_2$, electrical drive circuit 150 causes electrical drive signal $132_2$ to be at 0.5 V, which is the low level of that signal. When each of bitstreams 148, $154_1$, and $154_2$ has a voltage swing of 1 V between the two binary levels thereof, the above-indicated levels of electrical drive signals $132_1$ and $132_2$ can be achieved, e.g., by setting the electrical gains G1 and G2 at 1.5 and 2.5, respectively. Referring to FIG. 2C, constellation 210 can be obtained, e.g., using the optical transfer functions 202, 204, 206, and 208 of FIG. 2A and by tuning the output wavelength of laser 110 to 1570 nm. Relationship between data symbols of constellation 210 and optical transfer functions 202, 204, 206, and 208 of FIG. 2A is indicated by the corresponding arrows, which connect FIGS. 2A and 2B. Each of the data symbols of constellation 210 encodes (exactly) two bits. One of the two bits is provided by bitstream $154_1$, and the other of the two bits is provided by bitstream $154_2$. Constellation 210 is one-dimensional and unipolar in the sense that all data symbols thereof are located on the same side of the constellation axis with respect to the origin.

Note that constellation 210 has a non-uniform spacing between its four data symbols, i.e., the distance between neighboring data symbols increases as the symbol power increases. Such a constellation may be useful, e.g., for nonlinearly impaired optical channels, wherein the optical noise increases nonlinearly with an increase of the optical power. An alternative configuration in which the data symbols of the corresponding constellation are substantially uniformly spaced (e.g., are equidistant) is also possible (see, e.g., FIGS. 4A-4D). In general, the four intensity levels corresponding to the data symbols of constellation 210 can be moved with respect to one another and/or with respect to the origin of the constellation using one or more of the following circuit-configuration adjustments: (i) changing the electrical gains of amplifiers $156_1$ and $156_2$; (ii) changing DC bias voltages V1 and V2; (iii) changing the temperatures of SCEAMs $130_1$ and $130_2$; and (iv) changing the wavelength of light beam 112.

Figure 3A:
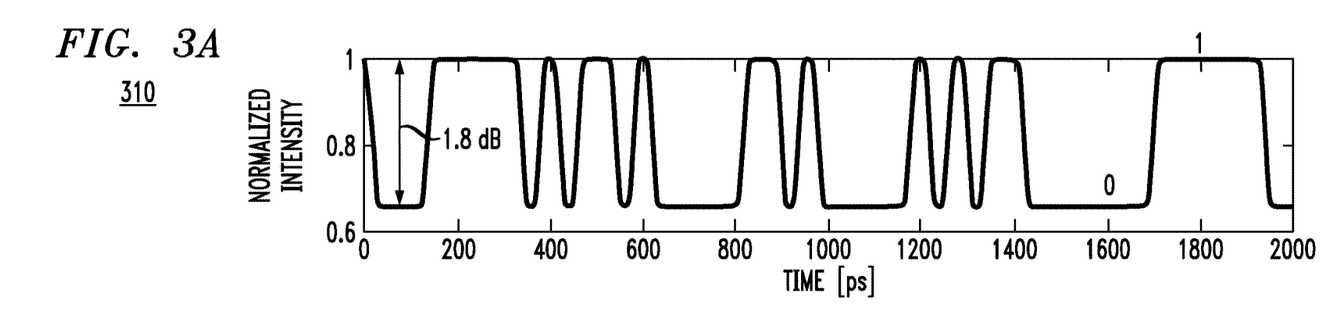
FIGS. 3A-3C graphically illustrate example optical waveforms that can be generated in the optical data transmitter of FIG. 1 according to an embodiment.
Figure 3B:
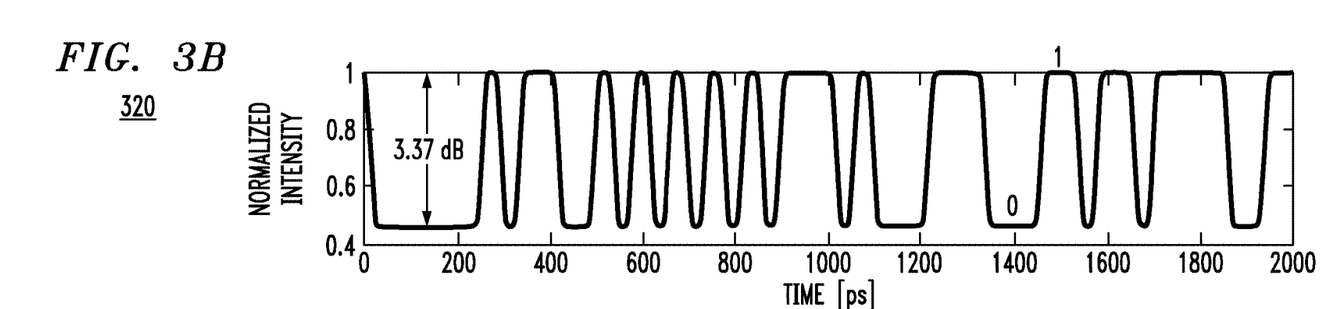
Figure 3C:
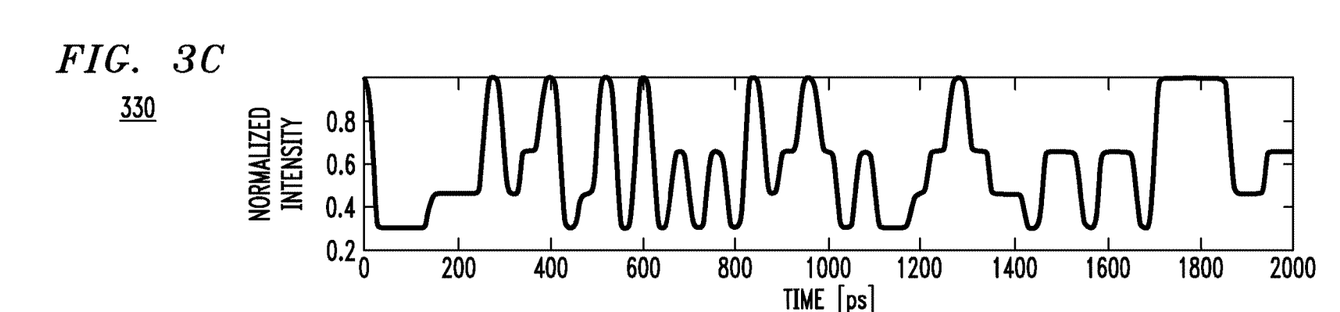

FIGS. 3A-3C graphically illustrate example optical waveforms that can be generated in optical data transmitter 100 according to an embodiment. More specifically, the shown waveforms correspond to the configuration in which optical data transmitter 100 generates a sequence of data symbols of constellation 210 (FIG. 2B) using drive signals $132_1$ and $132_2$ generated as indicated in FIG. 2C when the output wavelength of laser 110 is 1570 nm. The temperature of SCEAMs $130_1$ and $130_2$ is T=20° C. In this particular example, the bit rate of bitstream 148 is 25 Gbit/s.

FIG. 3A graphically shows an optical waveform 310 generated by SCEAM $130_1$ in the above configuration. Optical waveform 310 represents the intensity ratio of optical signals 117 and 112 at SCEAM $130_1$. The extinction ratio (ER) corresponding to the two binary levels of optical waveform 310 is about 1.8 dB.

FIG. 3B graphically shows an optical waveform 320 generated by SCEAM $130_2$ in the above configuration. Optical waveform 320 represents the intensity ratio of optical signals 122 and 117 at SCEAM $130_2$. The extinction ratio corresponding to the two binary levels of optical waveform 320 is about 3.4 dB.

FIG. 3C graphically shows an optical waveform 330 generated by the serially optically connected SCEAMs $130_1$ and $130_2$ driven in the above configuration. Optical waveform 330 represents the intensity ratio of optical signals 122 and 112. A person of ordinary skill in the art will understand that optical waveform 330 is proportional to the product of optical waveforms 310 and 320. The four distinct intensity levels corresponding to constellation 210 (FIG. 2B) are clearly visible in optical waveform 330.

Figure 4A:
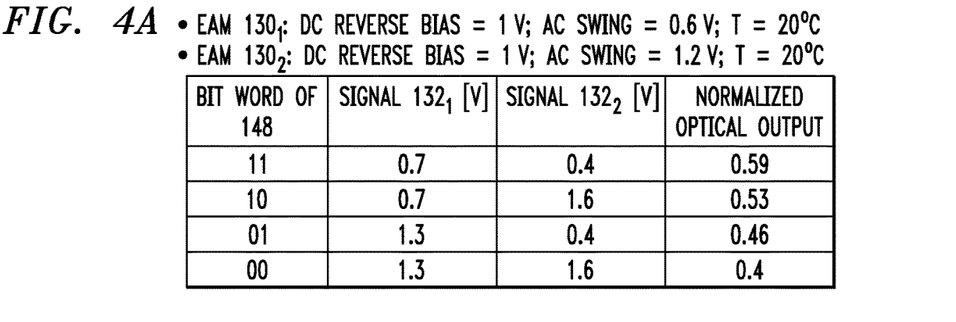
FIGS. 4A-4D show parameters of several example configurations of the optical data transmitter of FIG. 1 according to an embodiment.
Figure 4B:
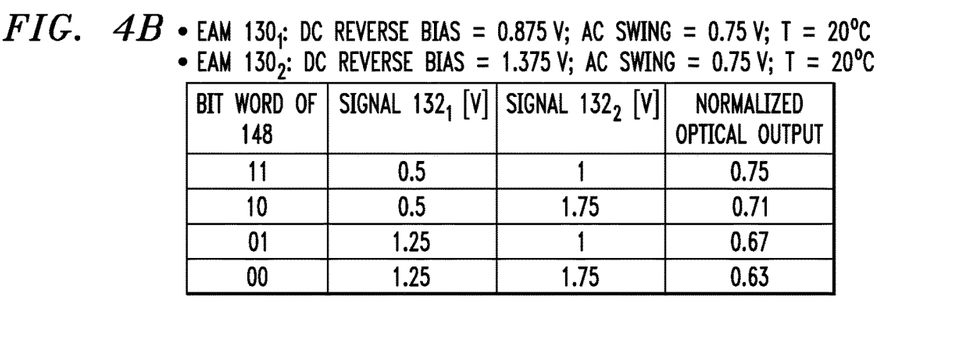

FIGS. 4A-4D show parameters of several alternative example configurations of optical data transmitter 100 according to an embodiment. Each of these configurations cause optical data transmitter 100 to generate data symbols of a respective unipolar 4-PAM constellation, in which the intensity levels are substantially equidistant. The last column in each of the tables shown in FIGS. 4A-4D explicitly shows those (substantially equidistant) intensity levels. For example, the distance between the neighboring intensity levels in the unipolar 4-PAM constellation corresponding to FIG. 4A is approximately 0.06 relative units. The distance between the neighboring intensity levels in the unipolar 4-PAM constellation corresponding to FIG. 4B is approximately 0.04 relative units, etc.

Figure 4C:
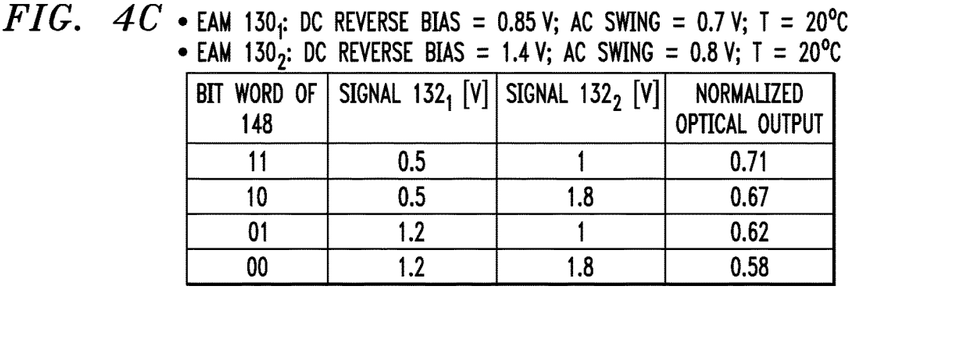
Figure 4D:
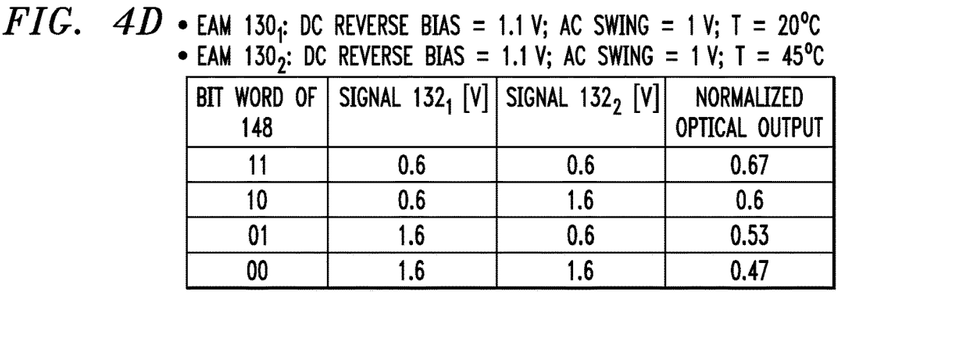

The circuit configuration corresponding to FIG. 4A is an example configuration in which: (i) the DC bias voltages V1 and V2 are the same; (ii) the electrical gains G1 and G2 of amplifiers $156_1$ and $156_2$ are different; and (iii) SCEAMs $130_1$ and $130_2$ are at the same temperature. The circuit configuration corresponding to FIG. 4B is an example configuration in which: (i) the DC bias voltages V1 and V2 are different; (ii) the electrical gains G1 and G2 of amplifiers $156_1$ and $156_2$ are the same; and (iii) SCEAMs $130_1$ and $130_2$ are at the same temperature. The circuit configuration corresponding to FIG. 4C is an example configuration in which: (i) the DC bias voltages V1 and V2 are different; (ii) the electrical gains G1 and G2 of amplifiers $156_1$ and $156_2$ are different; and (iii) SCEAMs $130_1$ and $130_2$ are at the same temperature. The circuit configuration corresponding to FIG. 4D is an example configuration in which: (i) the DC bias voltages V1 and V2 are the same; (ii) the electrical gains G1 and G2 of amplifiers $156_1$ and $156_2$ are the same; and (iii) SCEAMs $130_1$ and $130_2$ are at different respective temperatures.

Figure 5:
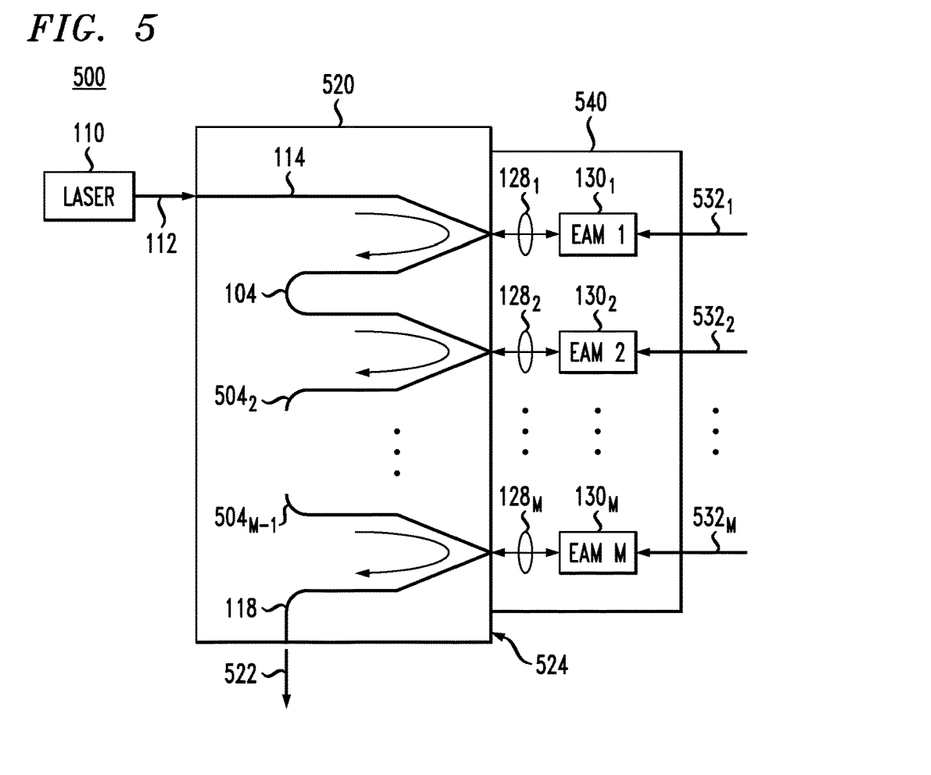
FIG. 5 shows a block diagram of an electro-optical assembly according to an embodiment.

FIG. 5 shows a block diagram of an electro-optical assembly 500 according to an embodiment. Assembly 500 comprises laser 110 and SCEAMs $130_1$-$130_M$, which are serially optically connected using a PLC 520, where M is an integer greater than two. SCEAMs $130_1$-$130_M$ are arranged in a linear array on a device carrier or substrate 540 and are optically coupled, using an array of coupling lenses $128_1$-$128_M$, to a plurality of waveguide ends located at an edge 524 of PLC 520, e.g., as indicated in FIG. 5. PLC 520 is generally similar to PLC 120, except that PLC 520 has additional waveguides, labeled $504_2$-$504_{M-1}$, that are serially connected between waveguide 104 and waveguide 118 (also see FIG. 1). In an example embodiment, each of waveguides $504_2$-$504_{M-1}$ can be similar to waveguide 104.

In some embodiments, lenses $128_1$-$128_M$ may be absent. In such embodiments, SCEAMs $130_1$-$130_M$ are directly optically coupled to the edge 524 of PLC 520.

In operation, SCEAMs $130_1$-$130_M$ can be driven using electrical drive signals $532_1$-$532_M$, each of which is a two-level signal that may be generated in a manner similar to that used for generating electrical drive signals $132_1$ and $132_2$. More specifically, each of the electrical drive signals $532_1$-$532_M$ may be generated using a respective bias tee as a combination of a respective a fixed reverse-bias voltage and a respective electrical RF signal. The fixed reverse-bias voltages may be individually set, e.g., using an electronic controller analogous to controller 180 (FIG. 1). The electrical RF signals may be individually generated in response to the corresponding individual bitstreams, e.g., as explained above in the description of electrical drive circuit 150. The individual bitstreams may be generated by M-way demultiplexing the corresponding common source bitstream, such as bitstream 148 (FIG. 1).

Although individual temperature-control units are not explicitly shown in FIG. 5, such temperature-control units, e.g., similar to temperature-control units 134i, may be present in at least some embodiments of assembly 500. When present, the temperature-control units may be used to individually control the temperatures of SCEAMs $130_1$-$130_M$.

Assembly 500 can be used, e.g., to implement an alternative embodiment of optical data transmitter 100. A person of ordinary skill in the art will understand that such an alternative embodiment is capable of generating, e.g., symbols of a unipolar $2^M$-PAM constellation. Each data symbol of this constellation encodes M bits. Constellation 210 (FIG. 2B) may be considered as an example corresponding to M=2. In different embodiments, the intensity levels of the unipolar $2^M$-PAM constellation enabled by the use of assembly 500 may be equidistant or non-equidistant.

Figure 6:
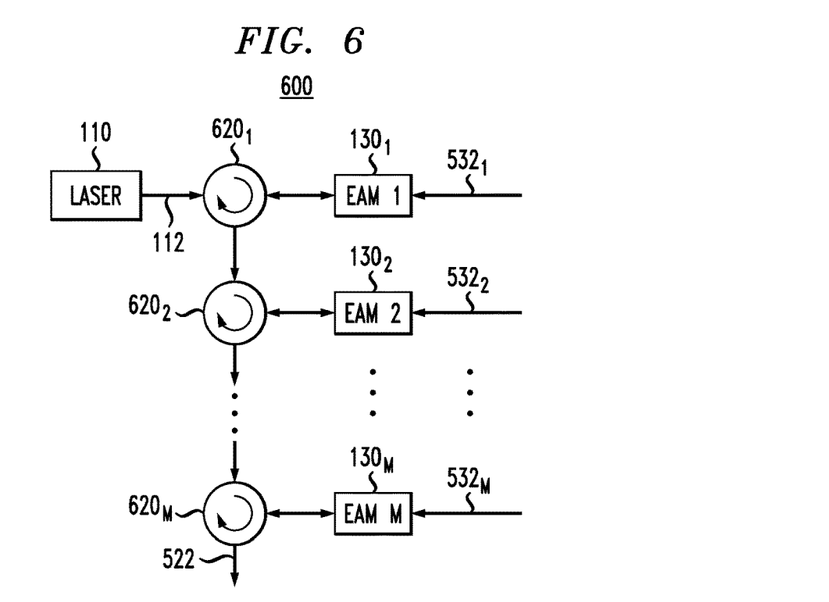
FIG. 6 shows a block diagram of an electro-optical assembly according to another embodiment.

FIG. 6 shows a block diagram of an electro-optical assembly 600 according to an embodiment. Assembly 600 is a modification of assembly 500, according to which PLC 520 is replaced by an array of optical circulators $620_1$-$620_M$. Similar to assembly 500, assembly 600 can be used to implement an alternative embodiment of optical data transmitter 100 capable of generating data symbols of a unipolar $2^M$-PAM constellation.

According to an example embodiment disclosed above, e.g., in the summary section and/or in reference to any one or any combination of some or all of FIGS. 1-6, provided is an apparatus comprising: first and second electro-absorption modulators (e.g., $130_1$, $130_2$, FIGS. 1, 5, 6) serially optically connected to generate a modulated optical signal (e.g., 122, FIG. 1; 522, FIGS. 5, 6); and an electrical drive circuit (e.g., 150, FIG. 1) connected to electrically drive the first electro-absorption modulator using a first two-level drive signal (e.g., $132_1$, FIG. 1; $532_1$, FIGS. 5, 6) and to electrically drive the second electro-absorption modulator using a second two-level drive signal (e.g., $132_2$, FIG. 1; $532_2$, FIGS. 5, 6), the first and second two-level drive signals being generated to cause the modulated optical signal to carry a sequence of data symbols, each of the data symbols encoding at least two bits.

In some embodiments of the above apparatus, the apparatus is configured to cause the data symbols to be symbols of a unipolar $2^M$-pulse-amplitude-modulation constellation (e.g., 210, FIG. 2B), where M is an integer greater than one.

In some embodiments of any of the above apparatus, intensity levels corresponding to the data symbols are non-equidistant (e.g., as in 210, FIG. 2B).

In some embodiments of any of the above apparatus, the electrical drive circuit comprises a demultiplexer (e.g., 152, FIG. 1) configured to generate first and second bitstreams (e.g., $154_1$, $154_2$, FIG. 1) by demultiplexing a third bitstream (e.g., 148, FIG. 1); and wherein the electrical drive circuit is configured to generate the first two-level drive signal in response to the first bitstream and to generate the second two-level drive signal in response to the second bitstream.

In some embodiments of any of the above apparatus, each of the first and second two-level drive signals has a respective low level and a respective high level (e.g., indicated in FIGS. 2C, 4A-4D), said respective low and high levels being selected to apply reverse biases to the first and second electro-absorption modulators.

In some embodiments of any of the above apparatus, the electrical drive circuit is configured to cause the respective low levels of the first and second two-level drive signals to be different (e.g., as in FIG. 4A).

In some embodiments of any of the above apparatus, the electrical drive circuit is configured to cause the respective high levels of the first and second two-level drive signals to be different (e.g., as in FIG. 4A).

In some embodiments of any of the above apparatus, the electrical drive circuit is configured to cause a difference between the low and high levels of the first two-level drive signal to be different from a difference between the low and high levels of the second two-level drive signal (e.g., as in FIG. 4A).

In some embodiments of any of the above apparatus, the electrical drive circuit comprises first and second electrical radio-frequency amplifiers (e.g., $156_1$, $156_2$, FIG. 1) and first and second bias tees (e.g., $162_1$, $162_2$, FIG. 1), the first electrical radio-frequency amplifier and the first bias tee being serially connected to generate the first two-level drive signal, the second electrical radio-frequency amplifier and the second bias tee being serially connected to generate the second two-level drive signal.

In some embodiments of any of the above apparatus, DC bias voltages applied to the first and second bias tees are individually controllable (e.g., V1, V2, FIG. 1).

In some embodiments of any of the above apparatus, gains of the first and second electrical radio-frequency amplifiers are individually controllable (e.g., via G1, G2, FIG. 1).

In some embodiments of any of the above apparatus, the apparatus further comprises first and second temperature-control units (e.g., 134₁, 134₂, FIG. 1) configured to individually control temperatures of the first and second electro-absorption modulators.

In some embodiments of any of the above apparatus, DC bias voltages applied to the first and second bias tees are individually controllable (e.g., V1, V2, FIG. 1); and wherein electrical gains of the first and second electrical radio-frequency amplifiers are individually controllable (e.g., via G1, G2, FIG. 1).

In some embodiments of any of the above apparatus, the apparatus further comprises first and second temperature-control units (e.g., 134₁, 134₂, FIG. 1) configured to individually control temperatures of the first and second electro-absorption modulators.

In some embodiments of any of the above apparatus, the apparatus comprises M electro-absorption modulators (e.g., 130₁-130$_M$, FIGS. 5, 6) serially optically connected to generate the modulated optical signal, said M electro-absorption modulators including the first and second electro-absorption modulators, where M is an integer greater than two.

In some embodiments of any of the above apparatus, the apparatus further comprises a planar lightwave circuit (e.g., 120, FIG. 1; 520, FIG. 5) including optical waveguides arranged to serially optically connect the first and second electro-absorption modulators.

In some embodiments of any of the above apparatus, the apparatus further comprises first and second optical circulators (e.g., 620₁, 620₁, FIG. 6) arranged to serially optically connect the first and second electro-absorption modulators.

In some embodiments of any of the above apparatus, each of the first and second electro-absorption modulators is configured to operate in reflection.

While this disclosure includes references to illustrative embodiments, this specification is not intended to be construed in a limiting sense.

Although example embodiments are described above in reference to EAMs designed to operate in reflection, a person of ordinary skill in the art will be able, based on the provided description, to make and use alternative embodiments employing EAMs designed to operate in transmission.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three dimensional structure as shown in the figures. Such "height" would be vertical where the substrate is horizontal but would be horizontal where the substrate is vertical, and so on.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus comprising an optical data transmitter, wherein the optical data transmitter comprises:
   first and second electro-absorption modulators serially optically connected to each other to generate a modulated optical signal; and
   an electrical drive circuit connected to electrically drive the first electro-absorption modulator using a first two-level drive signal and to electrically drive the second electro-absorption modulator using a second two-level drive signal, the first and second two-level drive signals being generated to cause the modulated optical signal to carry a sequence of data symbols such that each of the data symbols encodes two bits of a bitstream received by the optical data transmitter, the electrical drive circuit configured to cause the first two-level drive signal to carry one of the two bits and to cause the second two-level drive signal to carry the other of the two bits.

2. The apparatus of claim 1, wherein the apparatus is configured to cause the data symbols to be symbols of a unipolar $2^M$-pulse-amplitude-modulation constellation, where M is an integer greater than one.

3. The apparatus of claim 2, wherein intensity levels corresponding to the data symbols are non-equidistant.

4. The apparatus of claim 1,
   wherein the electrical drive circuit comprises a demultiplexer configured to generate first and second other bitstreams by demultiplexing the bitstream received by the optical data transmitter; and
   wherein the electrical drive circuit is configured to generate the first two-level drive signal in response to the first other bitstream and to generate the second two-level drive signal in response to the second other bitstream.

5. The apparatus of claim 1, wherein each of the first and second two-level drive signals has a respective low level and a respective high level, said respective low and high levels being selected to apply reverse biases to the first and second electro-absorption modulators.

6. The apparatus of claim 5, wherein the electrical drive circuit is configured to cause the respective low levels of the first and second two-level drive signals to be different.

7. The apparatus of claim 5, wherein the electrical drive circuit is configured to cause the respective high levels of the first and second two-level drive signals to be different.

8. The apparatus of claim 5, wherein the electrical drive circuit is configured to cause a difference between the low and high levels of the first two-level drive signal to be different from a difference between the low and high levels of the second two-level drive signal.

9. The apparatus of claim 1, wherein the electrical drive circuit comprises first and second electrical radio-frequency amplifiers and first and second bias tees, the first electrical radio-frequency amplifier and the first bias tee being serially connected to generate the first two-level drive signal, the second electrical radio-frequency amplifier and the second bias tee being serially connected to generate the second two-level drive signal.

10. The apparatus of claim 9, wherein DC bias voltages applied to the first and second bias tees are individually controllable.

11. The apparatus of claim 9, wherein gains of the first and second electrical radio-frequency amplifiers are individually controllable.

12. The apparatus of claim 9, wherein the optical transmitter further comprises first and second temperature-control units configured to individually control temperatures of the first and second electro-absorption modulators.

13. The apparatus of claim 12,
wherein DC bias voltages applied to the first and second bias tees are individually controllable; and
wherein electrical gains of the first and second electrical radio-frequency amplifiers are individually controllable.

14. The apparatus of claim 1, wherein the optical data transmitter further comprises first and second temperature-control units configured to individually control temperatures of the first and second electro-absorption modulators.

15. The apparatus of claim 1, wherein the optical data transmitter comprises M electro-absorption modulators serially optically connected to generate the modulated optical signal, said M electro-absorption modulators including the first and second electro-absorption modulators, where M is an integer greater than two.

16. The apparatus of claim 1, wherein the optical data transmitter further comprises a planar lightwave circuit including optical waveguides arranged to serially optically connect the first and second electro-absorption modulators.

17. The apparatus of claim 1, wherein the optical data transmitter further comprises first and second optical circulators arranged to serially optically connect the first and second electro-absorption modulators.

18. The apparatus of claim 1, wherein each of the first and second electro-absorption modulators is configured to operate in reflection.

* * * * *